Nov. 27, 1928.
J. J. SHEA
1,693,256
AUTOMATIC CURRENT CUT-OUT ELECTRIC FLATIRON
Filed Jan. 29, 1926
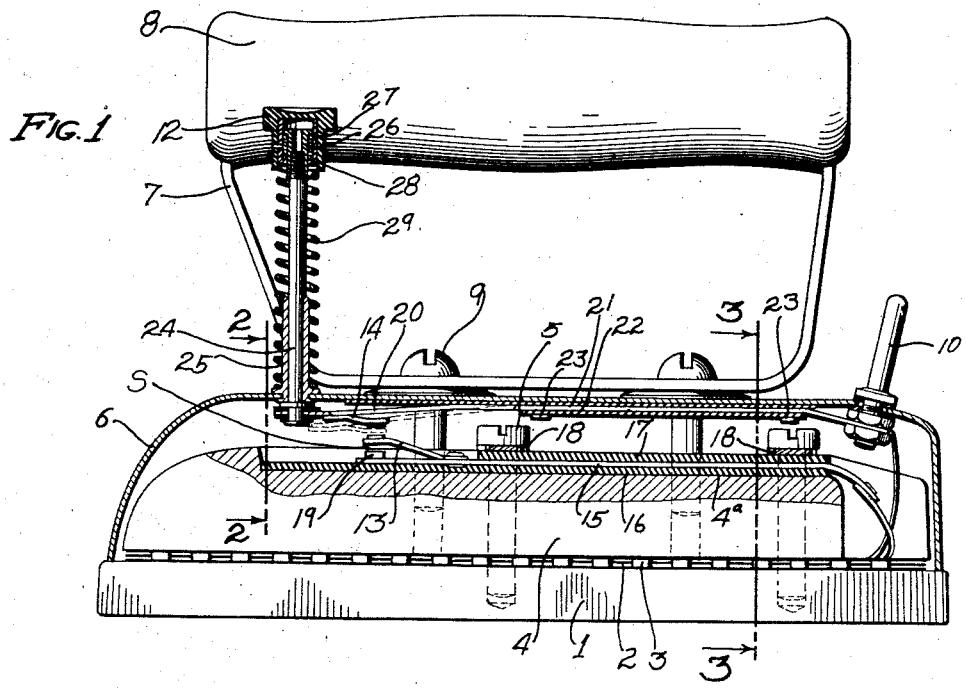
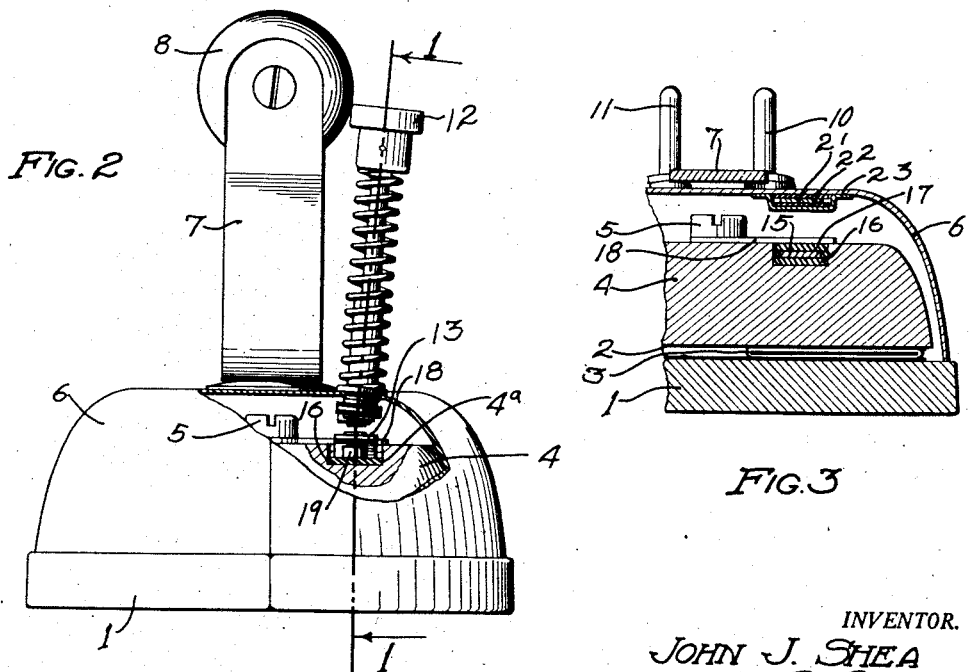
INVENTOR.
JOHN J. SHEA
BY A. B. Bowman
ATTORNEY Patented Nov. 27, 1928.

1,693,256

UNITED STATES PATENT OFFICE.

JOHN J. SHEA, OF SAN DIEGO, CALIFORNIA.

AUTOMATIC CURRENT-CUT-OUT ELECTRIC FLATIRON.

Application filed January 29, 1926. Serial No. 84,534.

My invention relates to an automatic current cut-out electric flatiron, and the objects of my invention are: first, to provide an electric flatiron having near its manipulating handle a switch control handle or knob whereby, when the flatiron is gripped and handled, the switch control handle or knob may be manipulated for connecting the electric heating element of the iron with a source of electrical energy, and when the switch control handle or knob is released by the hand of the operator or when the operator leaves the iron or is through ironing, the electric current to the electric heating element is automatically shut off, thus providing an economy and safety switch means for devices of this class; second, to provide a safety electric flatiron of this class having a heating element, terminal posts, a grip handle, and a resilient switch means adapted to connect one of the terminal posts with the heating element but normally adapted to electrically separate said terminal post from said heating element until the control handle or knob of the switch means, positioned contiguous to the grip handle of the iron, is manipulated; third, to provide a novelly constructed automatic current cut-out switch means of this class for electric flatirons; fourth, to provide an automatic current cut-out electric flatiron of this class which is very simple and economical of construction, durable, efficient, reliable and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a partial sectional and partial elevational view of my automatic current cut-out electric flatiron, with the section taken through 1—1 of Fig. 2, certain parts and portions taken on the sectional line being also shown in elevation to facilitate the illustration; Fig. 2 is a front elevational view thereof, showing certain parts and portions thereof broken away and in section to facilitate the illustration, the section portions being taken through 2—2 of Fig. 1, and Fig. 3 is a fragmentary sectional elevational view thereof, taken through 3—3 of Fig. 1.

Like characters of reference refer to similar parts and portions throughout the several views of the drawings.

The main frame and heating portion of my electric flatiron, as illustrated in the drawings, and consisting of the base plate 1, the insulating material 2 positioned thereon, the electric heating element positioned between the insulating material, the upper plate 4 positioned above the insulating material and clamping the latter between the plates 1 and 2, the screws 5 securing the plate 4 to the base plate 1, the casing 6 enclosing the upper plate 4 and the heating element, the handle supporting member 7 positioned above the casing 6, the handle or grip 8 secured to the upper ends of the handle supporting member 7, and the screws 9 securing the handle supporting member 7 and the casing 6 to the upper plate 4, are of conventional construction and arrangement.

Within the casing 6 is positioned the current cut-out switch means S which is adapted to connect the heating element 3 with the terminal post 10, the other terminal post 11 being preferably permanently connected with the heating element. This switch means S is adapted to be controlled by one of the fingers of the hand gripping the handle or grip member 8, such as the thumb of the right hand, that is, if the iron is adapted to be used by a right handed person. Therefore, the switch controlling handle or knob, as indicated by 12 in Figs. 1 and 2, is positioned near the forward end and at the left-hand side of the handle or grip member 8 of the iron.

The switch means S consists of a pair of normally separated resilient switch members 13 and 14 having contacts at their adjacent sides and ends. The opposite end of the switch member 13 is secured to a bar or conductor 15 which is positioned between a pair of insulating members 16 and 17, said insulating members and bar 15 being positioned in a longitudinal slot 4ᵃ at the upper side of the upper plate 4 and are retained in said slot by means of clips 18 secured in position at their one ends by means of the screws 5. The bar 15 is secured at its normally rear end to one of the ends of the heating element 3. Below the free end of the switch member 13 and secured to the bar 15 is a positive stop member 19 for the free end of the switch member 13. The switch member 14 is secured at its one end to a resilient conductor 20 secured between a pair of insulating members 21 and 22 to the upper wall of the casing 6 by means of a pair of clips 23. The rear end of the conductor 20 is secured to the inner end of the terminal post 10, while the free and yieldable forward end thereof is secured to and insulated from the lower end of the plunger 24 extending into the casing 6. Said plunger is reciprocally mounted in a guide sleeve 25 which is permanently secured at its lower end to and in a recess of the casing 6, as shown best in Fig. 1. At the upper end of the plunger 24 is secured a shoulder sleeve 26 around which, and between the shoulder thereof and a corresponding shoulder of a socket member 28 positioned within the knob 12, is positioned a compression spring 27, as shown best in Fig. 1. Around the plunger 24 and the sleeve 25, and between the lower portion of said sleeve and the socket member 28 or knob 12, is positioned a compression spring 29 for normally holding the knob 12 outwardly or upwardly and the switch members 13 and 14 in disengaged relation. The springs 27 and 29 are positioned in counteracting relation, normally spacing the inner end of the shoulder sleeve 26 from the end of the recess within the knob 12; thus, when the knob 12 is depressed, the same is shifted downwardly a slight distance before motion is imparted to the plunger 24. Therefore, no contact will be made between the switch members 13 and 14 by a slight or accidental depression of the knob 12. Also, the knob 12 cannot be conveniently depressed beyond a limit at which the switch member 13 engages the stop 19.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In an electric flatiron, a casing, a current cut-out switch means positioned within the normally forward end of said casing for connecting the flatiron with a source of electrical energy, said switch means comprising a relatively stationary switch member and a resiliently mounted switch member, a plunger reciprocally mounted with its one end through the normally forward portion of the wall of said casing and secured at the end extending through said casing to said resiliently mounted switch member, a knob secured to the normally upper end of said plunger and adjacent the normally forward end of the handle of the flatiron and contiguous to one side thereof, and a compression spring positioned around said plunger and between said casing and said knob for normally electrically separating said switch members.

2. In an electric flatiron, a casing, a switch member positioned within said casing at the normally forward end thereof and connecting the flatiron with a source of electrical energy, another switch member positioned within said casing at the normally forward end thereof and in spaced relation with said first mentioned switch member, and a resiliently mounted reciprocating plunger supported by said casing and connected at its one end to said last mentioned switch member and provided at its opposite end with a knob positioned contiguous to the normally forward end of the handle of said flatiron whereby the same may be manipulated by a finger of the hand operating the flatiron for depressing the same when the iron is manipulated for connecting said switch members.

3. In an electric flatiron, a casing, a switch member positioned within said casing at the normally forward end thereof and connecting the flatiron with a source of electrical energy, another switch member positioned within said casing at the normally forward end thereof and in spaced relation with said first mentioned switch member, a handle positioned above the casing and secured thereto, a plunger guide sleeve secured in the wall of said casing, a plunger reciprocally mounted in said sleeve with its one end extending into the interior of said casing and secured to said last mentioned switch member, a knob yieldably connected to the opposite end of said plunger, and a compression spring positioned between said knob and said casing around said plunger for normally separating said switch members, said knob being positioned adjacent the normally forward end of said handle adapted to be manipulated by a finger of the hand gripping the handle.

In testimony whereof, I have hereunto set my hand at San Diego, California, this 18th day of January, 1926.

JOHN J. SHEA.